US011420107B2

(12) United States Patent
Zhao et al.

(10) Patent No.: US 11,420,107 B2
(45) Date of Patent: Aug. 23, 2022

(54) METHOD AND APPARATUS FOR DETECTING A DEALING SEQUENCE, STORAGE MEDIUM AND ELECTRONIC DEVICE

(71) Applicant: SENSETIME INTERNATIONAL PTE. LTD., Singapore (SG)

(72) Inventors: Haiyu Zhao, Singapore (SG); Jinyi Wu, Singapore (SG)

(73) Assignee: SENSETIME INTERNATIONAL PTE. LTD., Singapore (SG)

( * ) Notice: Subject to any disclaimer, the term of this patent is extended or adjusted under 35 U.S.C. 154(b) by 169 days.

(21) Appl. No.: 16/771,150

(22) PCT Filed: May 8, 2020

(86) PCT No.: PCT/IB2020/054374
§ 371 (c)(1),
(2) Date: Jun. 9, 2020

(87) PCT Pub. No.: WO2021/130555
PCT Pub. Date: Jul. 1, 2021

(65) Prior Publication Data
US 2022/0001266 A1 Jan. 6, 2022

(30) Foreign Application Priority Data
Dec. 24, 2019 (SG) ............................ 10201913152S

(51) Int. Cl.
*A63F 1/18* (2006.01)
*G06T 7/73* (2017.01)
(Continued)

(52) U.S. Cl.
CPC .................. *A63F 1/18* (2013.01); *A63F 1/14* (2013.01); *G06N 3/02* (2013.01); *G06T 7/74* (2017.01);
(Continued)

(58) Field of Classification Search
USPC ........................................ 273/5, 146; 463/22
See application file for complete search history.

(56) References Cited

U.S. PATENT DOCUMENTS

2003/0173737 A1* 9/2003 Soltys ................. G07F 17/3232
273/149 R
2007/0077987 A1* 4/2007 Gururajan ............. G07F 17/322
463/22
(Continued)

FOREIGN PATENT DOCUMENTS

CN 1758939 A 4/2006
CN 102143785 A 8/2011
(Continued)

OTHER PUBLICATIONS

Search Report and Written Opinion for Singapore Application No. 10201913152S, dated on Oct. 23, 2020, 6 pages.
(Continued)

*Primary Examiner* — Pierre E Elisca

(57) ABSTRACT

The present disclosure provides a method and apparatus for detecting a dealing sequence, a storage medium, and an electronic device. The method includes: obtaining a video stream of a game desktop, and detecting a game card from multiple image frames included in the video stream; in response to detecting a newly added game card from at least one of the multiple image frames, determining whether the newly added game card is in a target state in which dealing ends; after it is determined that the newly added game card is in the target state in which dealing ends, determining game information corresponding to the newly added game card; and determining, based on the game information, whether a sequence of dealing the newly added game card conforms to a predetermined dealing sequence.

18 Claims, 7 Drawing Sheets

(51) Int. Cl.

| | |
|---|---|
| ***G06V 20/40*** | (2022.01) |
| ***A63F 1/14*** | (2006.01) |
| ***G06N 3/02*** | (2006.01) |

(52) U.S. Cl.

CPC ...... *G06V 20/41* (2022.01); *A63F 2250/1036* (2013.01); *G06T 2207/10016* (2013.01)

(56) References Cited

U.S. PATENT DOCUMENTS

| | | | | |
|---|---|---|---|---|
| 2012/0015703 | A1 | 1/2012 | Berman et al. | |
| 2012/0080845 | A1 † | 4/2012 | Emori | |
| 2013/0267319 | A1 * | 10/2013 | Kuhn | G07F 17/3223 463/34 |
| 2015/0087371 | A1 * | 3/2015 | Hill | G07F 17/3223 463/11 |
| 2018/0268648 | A1 † | 9/2018 | Shigeta | |
| 2019/0228608 | A1 * | 7/2019 | Morin | G07F 17/322 |
| 2019/0311575 | A1 | 10/2019 | Green et al. | |

FOREIGN PATENT DOCUMENTS

| | | | |
|---|---|---|---|
| CN | 102441273 | A | 5/2012 |
| CN | 102641589 | A | 8/2012 |
| CN | 104096352 | A | 10/2014 |
| CN | 107427718 | A | 12/2017 |
| CN | 107617212 | A | 1/2018 |
| CN | 108601975 | A | 9/2018 |

OTHER PUBLICATIONS

International Search Report and Written Opinion for PCT Application No. PCT/IB2020/054374, dated Oct. 23, 2020, 8 pages.

Search Report and Written Opinion for Singapore Application No. 10201913152S, dated Jan. 28, 2020, 8 pages.

Macao Intellectual Property Office, Disagreement issued in Application No. I/1670, dated Nov. 23, 2021, 39 pages.

Japanese Patent Office Action, Office Action Issued in Application No. 2020-537228, dated Apr. 12, 2022, 6 pages.

State Intellectual Property Office of the People's Republic of China, Office Action and Search Report Issued in Application No. 202080000719.9, dated Mar. 31, 2022, 17 pages.

* cited by examiner
† cited by third party

METHOD AND APPARATUS FOR DETECTING A DEALING SEQUENCE, STORAGE MEDIUM AND ELECTRONIC DEVICE

CROSS REFERENCE TO RELATED APPLICATIONS

This application is a national phase application of International Application No PCT/IB2020/054374, filed on May 8, 2020, which claims priority to Singaporean Patent Application No. 10201913152S entitled "METHOD AND APPARATUS FOR DETECTING DEALING SEQUENCE, STORAGE MEDIUM AND ELECTRONIC DEVICE" and filed on Dec. 24, 2019, the disclosure of which is incorporated herein by reference in its entirety.

TECHNICAL FIELD

The present disclosure relates to computer vision technology and, in particular, to a method and apparatus for detecting a dealing sequence, a storage medium and an electronic device.

BACKGROUND

Generally, in a card game, game cards are manually dealt. When dealing the game cards continuously and mechanically, a dealer may make a mistake.

SUMMARY

The present disclosure provides a method and apparatus for detecting a dealing sequence, a storage medium, and an electronic device.

According to a first aspect of the present disclosure, a method of detecting a dealing sequence includes: obtaining a video stream of a game desktop, and detecting a game card from multiple image frames included in the video stream; in response to detecting a newly added game card from at least one of the multiple image frames, determining whether the newly added game card is in a target state in which dealing ends; after it is determined that the newly added game card is in the target state in which dealing ends, determining game information corresponding to the newly added game card; and determining, based on the game information, whether a sequence of dealing the newly added game card conforms to a predetermined dealing sequence.

According to a second aspect of the present disclosure, an apparatus for detecting a dealing sequence provided includes: a detecting module configured to obtain a video stream of a game desktop and detect a game card from multiple image frames included in the video stream; a first determining module configured to, in response to the detecting module detecting a newly added game card from at least one of the multiple image frames, determine whether the newly added game card is in a target state in which dealing ends; a second determining module configured to, after it is determined by the first determining module that the newly added game card is in the target state in which dealing ends, determine game information corresponding to the newly added game card; and a third determining module configured to determine, based on the game information, whether a sequence of dealing the newly added game card conforms to a predetermined dealing sequence.

According to a third aspect of the present disclosure, a computer-readable storage medium stores a computer program thereon, where the computer program is used to perform the method of detecting a dealing sequence according to the first aspect.

According to a fourth aspect of the present disclosure, an electronic device includes a processor and a memory for storing instructions executable by the processor, where the processor is configured to execute the instructions stored in the memory to implement the method of detecting a dealing sequence according to the first aspect.

In the embodiments of the present disclosure, it can be automatically determined whether a sequence of dealing a newly added game card conforms to a predetermined dealing sequence. Thus, if it is determined that the sequence of dealing the newly added game card does not conform to the predetermined dealing sequence, warning information may be sent to a game controller, such as a dealer, to inform the game controller of a dealing error, thereby reducing man-made dealing errors and improving intelligence of a game process.

It should be appreciated that the above general description and the following detailed description are merely illustrative and explanatory, and are not intended to limit the present disclosure.

DETAILED DESCRIPTION

Exemplary embodiments will be described in detail with reference to the accompanying drawings. When the following description relates to the accompanying drawings, unless otherwise indicated, the same numbers refer to the same or similar elements in different accompanying drawings. The implementations described in the following exemplary embodiments do not represent all implementations consistent with the present disclosure. In contrast, they are merely examples of apparatuses and methods consistent with some aspects of the present disclosure as recited in the appended claims.

Terms in the present disclosure are merely for describing specific embodiments and are not intended to limit the present disclosure. The term "a", "the" or "said" in a singular form in the present disclosure and the appended claims are also intended to cover a plural form, unless specifically otherwise indicated in the context. It should also be appreciated that the term "and/or" in the present disclosure refers to and include any of one or more associated listed items and all possible combinations thereof.

It should be appreciated that although terms such as "first", "second", "third", and the like may be used in the present disclosure to describe various information, the information should not be limited by the terms. These terms are only used to distinguish the same type of information from each other. For example, without departing from the scope of the present disclosure, first information may be referred to as second information, and similarly the second information may be also referred to as the first information. Depending on the context, the word "if" as used herein may be explained as "when" or "upon" or "in response to determining".

An embodiment of the present disclosure may provide a method of detecting a dealing sequence, which may be applied to an electronic device in any game place. The electronic device may include a camera for acquiring a video stream, and may automatically detect a dealing sequence by using the video stream acquired by the camera.

Figure 1:
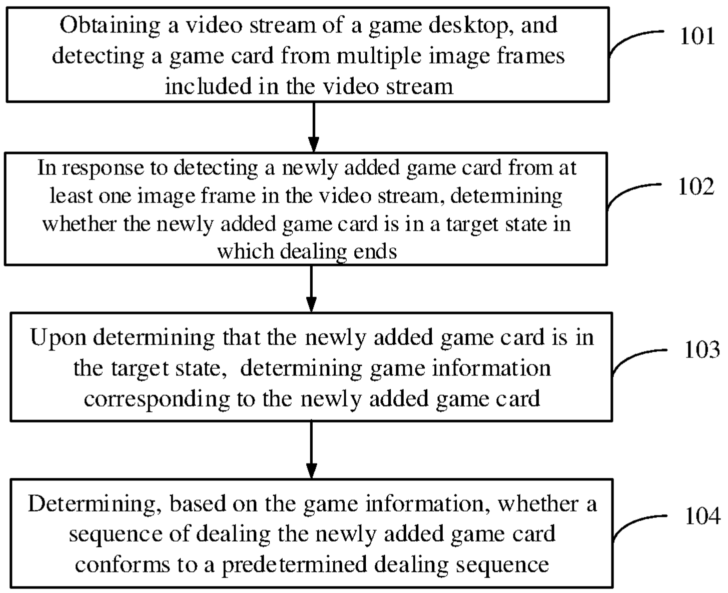
FIG. 1 is a flowchart of a method of detecting a dealing sequence according to an exemplary embodiment of the present disclosure.

FIG. 1 is a flowchart of a method of detecting a dealing sequence according to an exemplary embodiment. The method may include steps 101~104.

At step 101, a video stream of a game desktop is obtained, and a game card is detected from multiple image frames included in the video stream.

In an embodiment of the present disclosure, to automatically determine whether a dealing sequence is correct, each newly added game card is mainly detected from the multiple image frames included in the video stream.

At step 102, in response to detecting a newly added game card from at least one of the multiple image frames, it is determined whether the newly added game card is in a target state in which dealing ends.

In an embodiment of the present disclosure, if a newly added game card (for example, when there is no game card previously, or when there are M game cards previously) is detected from at least one of the multiple image frames, it may be determined whether the newly added game card is in the target state in which dealing ends.

Figure 2:
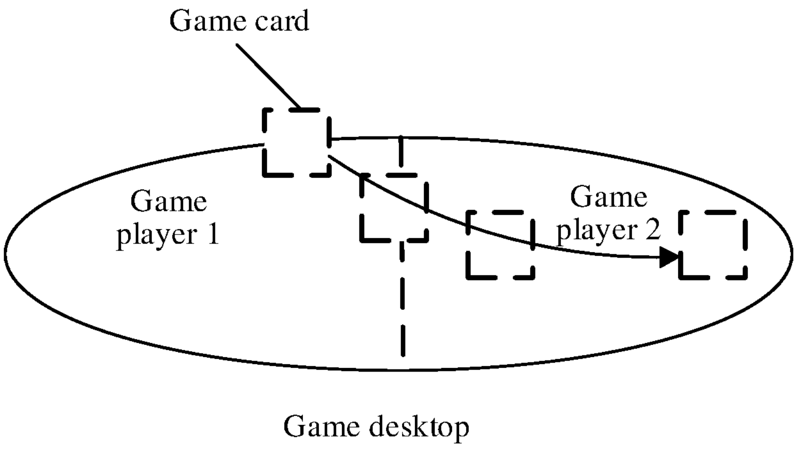
FIG. 2 is a schematic diagram of a scenario in a dealing process according to an exemplary embodiment of the present disclosure.

In an embodiment of the present disclosure, for example, as shown in FIG. 2, it is assumed that there are two players in total at a game desktop. The left half of the game desktop is a region where game player 1 is located, and the right half of the game desktop is a region where game player 2 is located. If a current newly added game card should be dealt to game player 2 according to a predetermined dealing sequence, the newly added game card may pass, in a dealing process, through the region where game player 1 is located and then be placed in the region where game player 2 is located. If it is determined, in the case where the newly added game card is not in the target state in which dealing ends, whether a sequence of dealing the newly added game card conforms to the predetermined dealing sequence, an error in the determination may be easily caused.

Therefore, to improve the accuracy of the dealing sequence detection, it is necessary to determine whether the newly added game card is in the target state in which dealing ends before performing subsequent steps.

At step 103, after it is determined that the newly added game card is in the target state in which dealing ends, game information corresponding to the newly added game card is determined.

The game information may include, but be not limited to, one or a combination of the following: card location information about a location of the newly added game card on the game desktop, dealing sequence information about a sequence of dealing the newly added game card in a game, or card identity information about identity of the newly added game card. The card identity information includes at least one of a suit or the number of points of the newly added game card.

In an embodiment of the present disclosure, the card location information about a location of the newly added game card on the game desktop may correspond to a certain specific region to which a location of the newly added game card belongs.

The dealing sequence information about a sequence of dealing the newly added game card in the game may correspond to the number of game cards in a specific region when the newly added game card is in the target state in which dealing ends. The specific region is a region where the game card in the target state in which dealing ends is located, or a region where some game cards in the target state in which dealing ends are located.

For example, if the newly added game card is located in a game region for player 1 (that is, the specific region) and the game region for player 1 contains 3 game cards when the newly added game card is in the target state in which dealing ends, the dealing sequence information about a sequence of dealing the newly added game card is 3.

The card identity information includes information capable of identifying the newly added game card, such as a suit or the number of points. For example, the card identity information is ♥ 2, ♣ 10 or the like.

At step 104, whether a sequence of dealing the newly added game card conforms to a predetermined dealing sequence is determined based on the game information.

In an embodiment of the present disclosure, it is assumed that the predetermined dealing sequence involves a specified dealing sequence with respect to regions respectively corresponding to game players, specifically as follows: dealing individual cards sequentially to player 1, player 2, player 1, player 2 and so on. If it is determined, based on the specified dealing sequence, that a specified region where the newly added game card should be located is the game region for player 1, and it is determined, based on the card location information in the game information, that the newly added game card is in the game region for player 1, it can be determined that the sequence of dealing the newly added game card conforms to the predetermined dealing sequence.

As another example, it is assumed that the predetermined dealing sequence is as follows: dealing individual cards sequentially to player 1, player 2, player 1, player 2 and so on, and that, if the total number of points of the game card(s) hold by any player does not exceed a preset point value corresponding to the game, a game card may be still dealt to the player. If it is determined, based on a specified dealing sequence with respect to regions respectively corresponding to game players, that a specified region where the newly added game card should be located is the game region for player 2, a region to which a location of the newly added game card belongs is the game region for player 2, game cards except the newly added game card in the game region for player 2 are respectively ♥ 4 and ♠ 4, and a preset point value is 10, it can be determined that the sequence of dealing the newly added game card conforms to the predetermined dealing sequence.

If it is determined that the sequence of dealing the newly added game card conforms to the predetermined dealing sequence, dealing may be continued. If it is determined that the sequence of dealing the newly added game card does not conform to the predetermined dealing sequence, a prompt or a warning may be sent to a game controller. Thus, whether a dealing sequence conforms to the predetermined dealing sequence may be automatically detected, thereby reducing man-made dealing errors and improving intelligence of a game process.

In some optional embodiments, to subsequently accurately determine a time point at which the newly added game card is in the target state, the video stream obtained at step 101 may include video streams that are synchronously acquired at multiple views on the game desktop. Optionally, the multiple views may include a side view and an overhead view, and the side view may include a left view and/or a right view.

Figure 3:
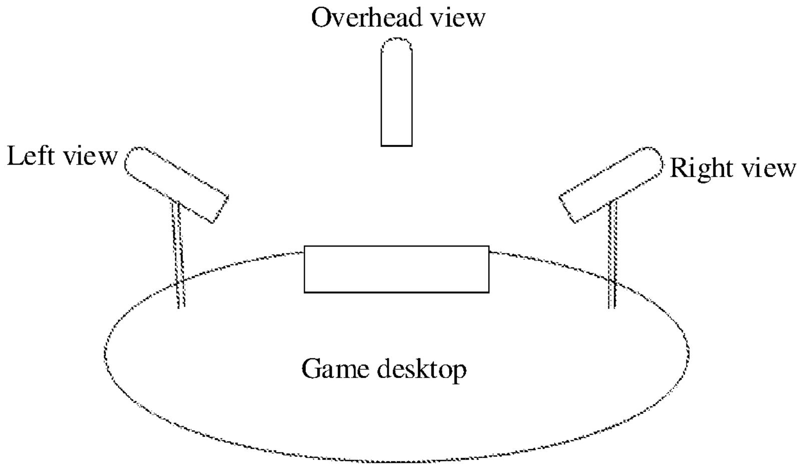
FIG. 3 is a schematic diagram of a scenario with multiple views according to an exemplary embodiment of the present disclosure.

For example, as shown in FIG. 3, a camera on the left may be used to acquire a video stream at the left view, a camera on the right may be used to acquire a video stream at the right view, and a camera in the middle may be used to acquire a video stream at the overhead view.

Accordingly, at step 102 of determining whether the newly added game card is in the target state, if a newly added game card is detected in at least one image frame of a video stream corresponding to a certain one of the multiple views, and it is determined that the newly added game card is in the target state in which dealing ends, a first image frame of the video stream corresponding to the view, from which it is detected that the newly added game card is in in the target state in which dealing ends, may be determined. A synchronous image of video streams acquired synchronously at other views, which is acquired synchronously with the first image frame, may be determined. If it is detected, in at least one of N image frames previous to the synchronous image, that the newly added game card is in the target state in which dealing ends, a time point corresponding to an image frame of the N image frames previous to the synchronous image, from which the newly added game card is first detected, may be taken as a time point at which the newly added game card is in the target state in which dealing ends.

If it is detected in none of the N image frames previous to the synchronous image that the newly added game card is in the target state, a time point corresponding to the first image frame may be taken as the time point at which the newly added game card is in the target state.

In an embodiment of the present disclosure, N may be determined based on an average duration of one round of a game, an average duration of each progress stage of a game, and an image sampling frequency, so as to ensure that the N image frames previous to the synchronous image are involved in the same round of a game. N may be a positive integer greater than or equal to 1 and less than or equal to 30.

The foregoing is merely an example of a value range of N. The value of N may be defined in the same round of a game based on a time of the game.

It is assumed that the first image frame corresponding to the left view is image a, and the synchronous image acquired synchronously with image a at the overhead view is image b. If it is detected, in at least one of N image frames previous to image b, that a newly added game card is in a target state in which dealing ends, it may be considered that the newly added game card is shielded from the left view during a period of time before image a is acquired, such that the earliest time point at which the newly added game card is in the target state in which dealing ends, which is determined from images acquired from the left view in the round of the game, is incorrect. In this case, a time point corresponding to an image frame of the N image frames previous to image b acquired at the overhead view, from which it is first detected that the newly added game card is in the target state, may be taken as a time point at which the newly added game card is in the target state in which dealing ends.

If video streams acquired respectively at three or more views are obtained, a synchronous image corresponding to the first image frame may be found for each of the views. If it may be detected, in at least one of N image frames previous to the synchronous image at each view, that the newly added game card is in the target state in which dealing ends, a respective time point corresponding to an image frame of the N image frames previous to the synchronous image at each view, from which it is first detected that the newly added game card is in the target state in which dealing ends, may be determined, and the earliest time point may be found from the determined respective time points and taken as a time point at which the newly added game card is in the target state in which dealing ends. Therefore, determination of a time point, at which that the newly added game card is in the target state in which dealing ends, based on video streams acquired respectively from multiple views is more accurate than determination of the time point based on a video stream acquired from a single view.

After the time point at which the newly added game card is in the target state is accurately determined, game information corresponding to the newly added game card may be more accurately determined based on an image frame corresponding to the time point, thereby finally improving accuracy of determining whether a sequence of dealing the newly added game card conforms to the predetermined dealing sequence.

In some optional embodiments, at step 101, a game card may be detected from multiple image frames included in the video stream by: inputting each image frame in the video stream to an object detection neural network to obtain an object detection result output by the object detection neural network.

In an embodiment of the present disclosure, the object detection neural network may be established in advance, and the object detection neural network may be a Faster Region Proposal Networks Convolutional Neural Network (RCNN). In a training process, multiple sample image frames with respective labels may be input to the Faster RCNN which may then output an object detection result for each sample image frame. Then, network parameters of the Faster RCNN may be adjusted based on true values (determined by the respective labels) of respective objects on the multiple sample image frames, so as to minimize a loss value. Thus, an object detection model may be established. Objects that can be detected by the object detection neural network may include, but be not limited to, at least one of a game card, a game player, a game chip, or a game currency.

In an embodiment of the present disclosure, after video streams acquired synchronously from multiple views on the game desktop are obtained, each image frame of the video streams may be input to the trained object detection neural network which may then output an object detection result for the image frame. The object detection result may at least indicate whether a game card is involved in the image frame of the video streams, and a location of the game card in the image frame with the game card involved therein. Thus, the availability is high.

Figure 4:
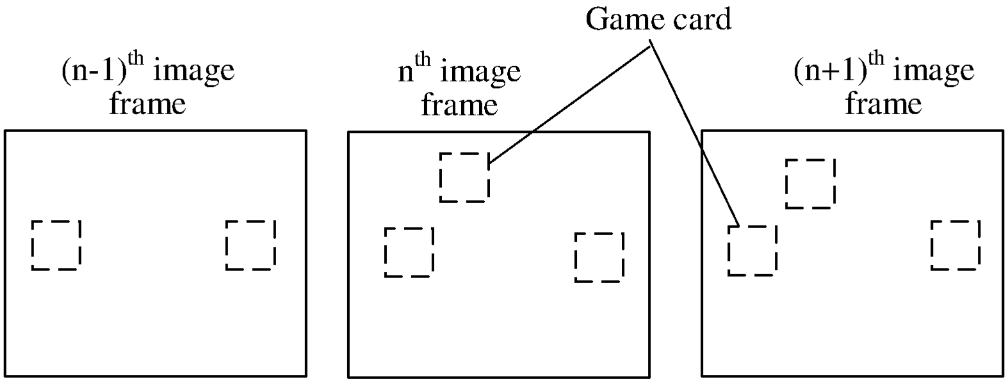
FIG. 4 is a schematic diagram of a scenario of detecting a dealing sequence according to an exemplary embodiment of the present disclosure.

In an embodiment of the present disclosure, to determine a dealing sequence, a location of a game card may be marked by a bounding box in an image frame of a video stream that involves the game card, for example, as shown in FIG. 4.

In some optional embodiments, from the aforementioned object detection result, a location of a game card in an image involving the game card may be determined, so that a newly added game card may be directly determined. For example, if no game card is included in each of previous multiple image frames, and a specific game card appears in each of consecutive multiple image frames starting from a certain image frame, it may be determined that the specific game card is the newly added game card. Alternatively, if each of previous multiple image frames involves 2 game cards, and each of multiple consecutive image frames starting from a certain image frame involves 3 game cards, it may be also determined that there is a newly added game card.

Figure 5:
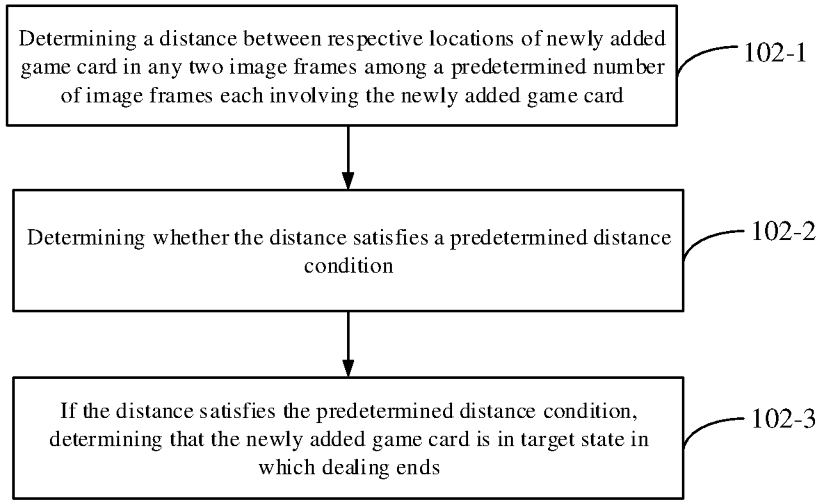
FIG. 5 is a flowchart of a process of performing an operation of the method in FIG. 1 according to an exemplary embodiment of the present disclosure.

Further, as shown in FIG. 5, a process of determining whether the newly added game card is in a target state in which dealing ends in step 102 may include steps 102-1~102-3.

At step 102-1, a distance between respective locations of the newly added game card in any two image frames, among a predetermined number of image frames each involving the newly added game card, may be determined.

To improve accuracy of determining whether the newly added game card is in the target state, the predetermined number may be set to a positive integer greater than or equal to 3. For example, the predetermined number of image frames may comprise the $N^{th}$ frame to the $(N+4)^{th}$ frame. In an embodiment of the present disclosure, Kalman filtering algorithm may be adopted to perform target tracking on the newly added game card and determine the distance between the respective locations of the newly added game card in any two image frames among the predetermined number of image frames.

At step 102-2, whether the distance between the respective locations satisfies a predetermined distance condition may be determined.

In an embodiment of the present disclosure, whether degree of overlap between the respective locations of the newly added game card in any two image frames among the predetermined number of image frames is greater than a predetermined value may be detected, so as to determine whether the predetermined distance condition is satisfied.

At step 102-3, if it is determined that the distance satisfies the predetermined distance condition, it may be determined that the newly added game card is in the target state in which dealing ends.

In an embodiment of the present disclosure, if degree of overlap between respective bounding boxes of the newly added game card in any two image frames among the predetermined number of image frames is greater than a predetermined value, it may be determined that the predetermined distance condition is satisfied, and that the newly added game card has been dealt and is in the target state in which dealing ends.

After it is determined, according to the foregoing embodiments, that the newly added game card is in the target state in which dealing ends, that is, after the newly added game card moves no longer, dealing sequence detection may be performed, thereby improving the accuracy of the dealing sequence detection.

In some optional embodiments, when Kalman filtering algorithm is applied to single target tracking, there is a basic assumption: both an error between a candidate detected value and a real value and an error between a predicted value and the real value follow Gaussian distribution. Therefore, impact of an error needs to be considered for calculating each of the detected value and the predicted value.

At an initialization phase of the algorithm, two parameter matrices may be given as follows: matrix X of a position of a geometric center of an object, which may be a 1×2 matrix, and covariance matrix P, which may be a 2×2 matrix. In addition, there is matrix Q used to measure an error of the covariance matrix, and Q is also a 2×2 matrix. Herein, for a game card, X is obtained based on a result of detection of the game card and corresponds to a detected value of position coordinates of a center of a bounding box of the game card in a current frame, P corresponds to hyperparameters which may be directly calculated based on X, and Q corresponds to artificially set hyperparameters.

When a current image frame is the $n^{th}$ image frame, $X_n$ may represent position coordinates of a center of a bounding box of the game card detected in the $n^{th}$ image frame and may be taken as a detected value, and $P_n$ may represent a covariance matrix that is calculated based on $X_n$ in the current image frame.

In an embodiment of the present disclosure, position coordinates of a center of a bounding box of the game card in a frame next to the current frame, that is, the $(n+1)^{th}$ image frame, are represented by $X_{n+1}$, and accordingly a covariance matrix is represented by $P_{n+1}$. Values of $X_{n+1}$ and $P_{n+1}$ may be considered respectively in the following two cases.

In the first case, a location of the game card in the $(n+1)^{th}$ image frame remains stationary relatively to that in the $n^{th}$ image frame, that is, a location of a center of a bounding box corresponding to the game card remains unchanged in the two image frames. Then, $X_{n+1}=X_n$ and $P_{n+1}=P_n+Q$.

In the second case, a location of the game card in the $(n+1)^{th}$ image frame changes relatively to that in the $n^{th}$ image frame.

In an embodiment of the present disclosure, position coordinates of the game card in the $(n+1)^{th}$ image frame may be predicted at least based on a trajectory of a change from a location of the game card in the $(n+1)^{th}$ image frame to that in the $n^{th}$ image frame, so as to obtain a predicted value $X_{n+1}'$. An error may exist in $X_{n+1}'$. Therefore, a location of a center of a bounding box corresponding to the game card in the $(n+1)^{th}$ image frame may be actually detected to obtain a detected value, with which $X_{n+1}'$ may be corrected to obtain $X_{n+1}$ and $P_{n+1}$.

On the other hand, an error may exist in the detected value. The error may be represented by R which is also an artificially preset hyperparameter. The candidate detected value may be corrected with R to obtain a corrected detected value $X_{n+1}''$.

Then, there are two Gaussian distributions: one is from the predicted value $X_{n+1}'$, and the other is from the corrected detected value $X_{n+1}''$. A difference between $X_{n+1}''$ and $X_{n+1}'$ may be multiplied by $X_{n+1}'$ to obtain a new distribution. A mean and a covariance for the new distribution may be obtained through mathematical calculation. The mean for the new distribution may be taken as $X_{n+1}$, and the covariance for the new distribution may be taken as $P_{n+1}$, where $X_{n+1}$ represents the position coordinates of the center of the bounding box of the game card in the $(n+1)^{th}$ image frame.

In an embodiment of the present disclosure, with Kalman filtering algorithm, respective locations of each game card in the predetermined number of image frames each involving the newly added game card may be determined, and then bipartite graph matching may be performed to determine respective locations of the newly added game card in any two image frames and determine a distance between the respective locations.

When Kalman filtering algorithm is used, for each game card involved in a current image frame, a predicted value $X_{n+1}'$ may be position coordinates of a center of a bounding box corresponding to the game card in a next image frame, which are predicted based on the current image frame and at least one previous image frame, and a detected value may be position coordinates of a center of a bounding box corresponding to the game card detected in the next image frame. The candidate detected value may be corrected with a preset error R to obtain a corrected detected value $X_{n+1}''$. Then, on the basis of the predicted value $X_{n+1}'$ and the corrected detected value $X_{n+1}''$, $X_{n+1}$ and $P_{n+1}$ may be calculated in the aforementioned manner, where $X_{n+1}$ represents position coordinates of the center of the bounding box corresponding to the game card in the next image frame. A location of the bounding box corresponding to the game card in the next image frame may be determined based on $P_{n+1}$ and $X_{n+1}$. Further, a matching algorithm may be applied to the current image frame and the next image frame, so as to match bounding boxes respectively corresponding to game cards included in the current image frame with bounding boxes respectively corresponding to game cards included in the next image frame one by one. Thus, after a location of a bounding box corresponding to a newly added game card in each image frame is determined, a distance between respective locations of the newly added game card in any two image frames can be determined.

Figure 6:
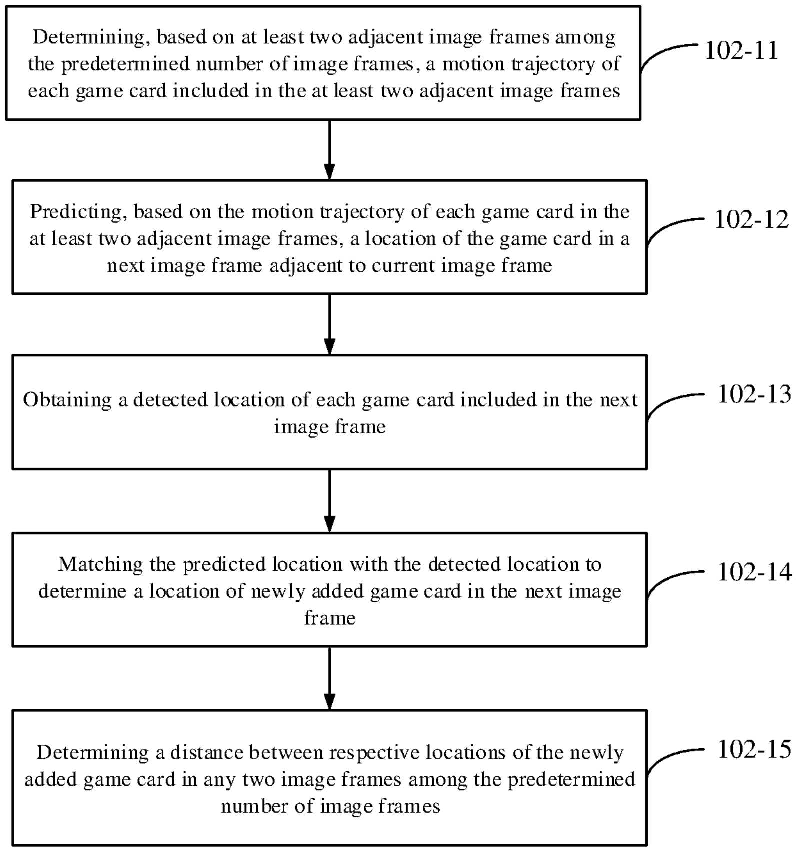
FIG. 6 is a flowchart of a process of performing an operation of the process in FIG. 5 according to an exemplary embodiment of the present disclosure.

For example, as shown in FIG. 6, step 102-1 may include steps 102-11-102-15.

At step 102-11, on the basis of at least two adjacent image frames among the predetermined number of image frames, a motion trajectory of each game card included in the at least two adjacent image frames may be determined. For example, the at least two adjacent image frames may include a current image frame and at least one previous image frame.

Figure 7A:
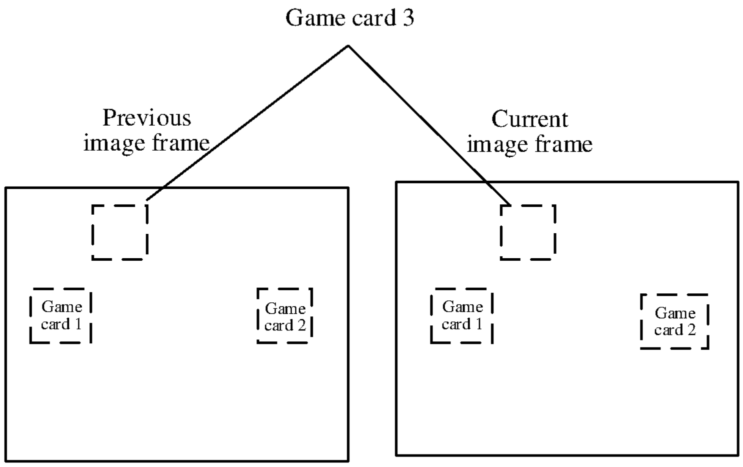
FIG. 7A to FIG. 7C are schematic diagrams of a scenario of detecting a dealing sequence according to an exemplary embodiment of the present disclosure.

For example, each of the current image frame and the at least one previous image frame includes three game cards, where game card 3 is a newly added game card, and respective locations of game cards 1, 2, and 3 in each of the previous image frame and the current image frame are shown in FIG. 7A. Position coordinates of a center of a bounding box corresponding to each game card in the current image frame may be represented by $X_n$.

At step 102-12, on the basis of the motion trajectory of each game card in the at least two adjacent image frames, a location of the game card in a next image frame adjacent to the current image frame may be predicted.

Figure 7B:
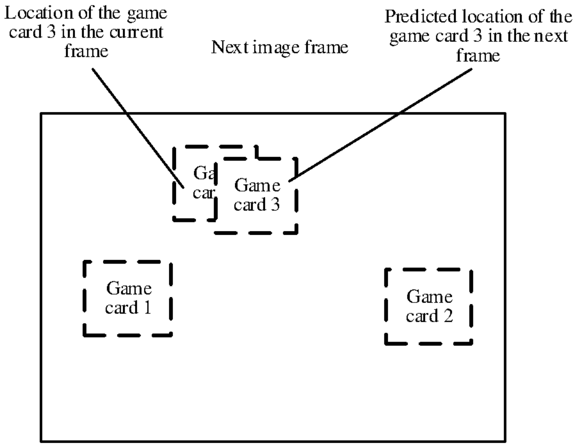

In an embodiment of the present disclosure, on the basis of the motion trajectory of each game card in the at least two adjacent image frames, a location of a center of a bounding box of the game card in the next image frame may be predicted. For example, as shown in FIG. 7B, it may be predicted that, in the next image frame, respective locations of game cards 1 and 2 remain unchanged and a location of game card 3 is moved rightward, thereby obtaining the predicted location $X_{n+1}'$.

At step 102-13, a detected location of each game card included in the next image frame may be obtained.

In an embodiment of the present disclosure, the next image frame may be input to an object detection neural network, and a detected location of each game card in the next image frame may be output by the object detection neural network. A corrected detected location $X_{n+1}''$ of each game card included in the next image frame may be obtained by correcting a respective detected location with a preset error R.

On the basis of the predicted location $X_{n+1}'$ and the corrected detected location $X_{n+1}''$ which are obtained, $X_{n+1}$ and $P_{n+1}$ may be calculated in the aforementioned manner A location of a bounding box corresponding to each game card included in the next image frame may be determined based on $X_{n+1}$ and $P_{n+1}$.

Iterative calculation according to the aforementioned process may be continued to obtain $X_{n+2}$ and $P_{n+2}$, . . . , and $X_{n+m}$ and $P_{n+m}$.

It should be noted that, although a location of a bounding box corresponding to each game card included in the next image frame may be identified through the above operation, it cannot be determined which specific game card corresponds to the location. Then, a location of each specific game card may need to be determined through matching.

At step 102-14, the predicted location may be matched with the detected location to determine a location of the newly added game card in the next image frame.

In an embodiment of the present disclosure, bipartite graph matching algorithm may be used to match the predicted location with the detected location. Bipartite graph matching refers to dividing all edges in two graphs into a set of multiple points and matching any two points in the two graphs with each other, which may obtain a group of matching results that all points in one graph are matched one by one with all points in the other graph.

In an embodiment of the present disclosure, bipartite graph matching is performed on the predicted location and the detected location, so that all points included in at least one edge of a predicted bounding box corresponding to each game card in the next image frame can be in one-to-one correspondence to all points included in at least one edge of a detected bounding box corresponding to each game card in the next image frame. Therefore, a location corresponding to each specific game card in the next image frame may be determined, and a location of the newly added game card in the next image frame may be obtained.

Figure 7C:
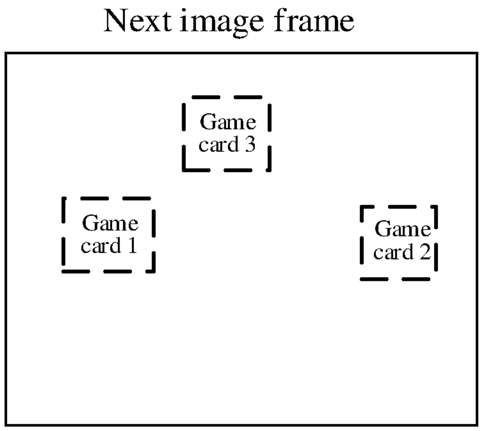

For example, a predicted location of each game card included in the next image frame is as shown in FIG. 7B, and a detected location of each game card included in the next image frame is as shown in FIG. 7C. By bipartite graph matching, it may be determined that there are a game card 1, game card 3, and game card 2 from left to right in the next image frame. If game card 3 is a newly added game card, a location of a bounding box in the middle corresponds to the location of the newly added game card.

At step 102-15, a distance between respective locations of the newly added game card in any two image frames among the predetermined number of image frames may be determined.

In an embodiment of the present disclosure, respective locations of a bounding box corresponding to the newly added game card in any two image frames among the predetermined number of image frames may be determined, so as to determine a distance between the respective locations of the newly added game card in the two image frames. In the embodiment, Kalman filtering algorithm may be used to track a game card, bipartite graph matching algorithm may be used to determine a location of a newly added game card in a next image frame, and then a distance between respective locations of the newly added game card in any two image frames among the predetermined number of image frames may be determined. Thus, a newly added game card can be automatically tracked, thereby facilitating subsequent determination of whether the newly added game card is in the target state in which dealing ends.

Figure 8:
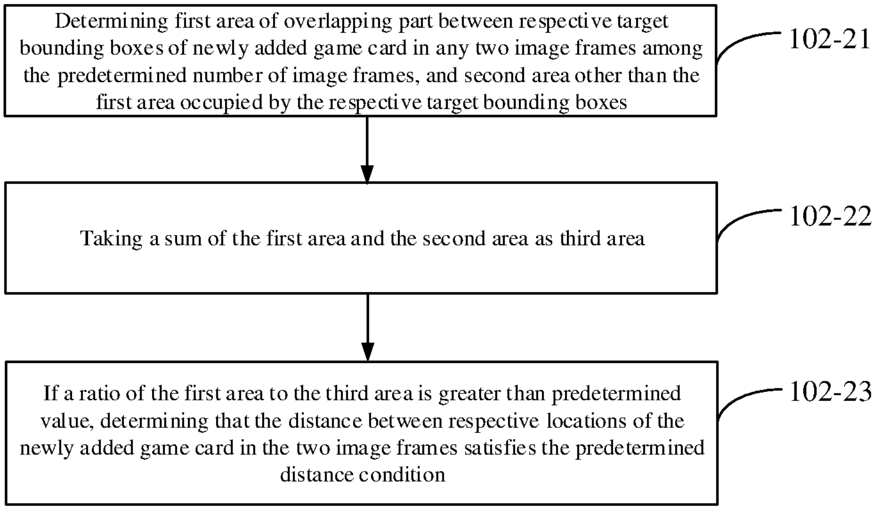
FIG. 8 is a flowchart of a process of performing an operation of the process in FIG. 5 according to an exemplary embodiment of the present disclosure.

In some optional embodiments, as shown in FIG. 8, step 102-2 may include steps 102-21~102-23.

At step 102-21, a first area of an overlapping part between respective target bounding boxes of the newly added game card in any two image frames among the predetermined number of image frames may be determined, and a second area other than the first area, occupied by the respective target bounding boxes, may be determined.

Figure 9:
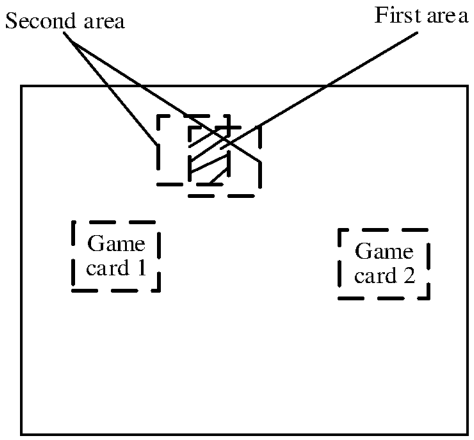
FIG. 9 is a schematic diagram of a scenario of detecting a dealing sequence according to an exemplary embodiment of the present disclosure.

For example, as shown in FIG. 9, two image frames are overlapped with each other, so that an area of an overlapping part between respective target bounding boxes corresponding to the newly added game card may be determined as the first area. A sum of areas other than the first area which are occupied by the respective target bounding boxes corresponding to the newly added game card may be determined as the second area.

At step 102-22, a sum of the first area and the second area is taken as a third area.

At step 102-23, if a ratio of the first area to the third area is greater than a predetermined value, it may be determined that the distance between the respective locations of the newly added game card in the two image frames satisfies the predetermined distance condition.

A greater ratio of the first area to the third area indicates a larger overlapping part between the target bounding boxes corresponding to the newly added game card in the two image frames, that is, respective central locations of the target bounding boxes being closer to each other.

For example, Intersection over Union (IOU) of respective target bounding boxes corresponding to the newly added game card in any two image frames among the predetermined number of image frames may be continuously detected to determine degree of overlap between the respective target bounding boxes. If the degree of overlap is greater than a predetermined value, it may be determined that the newly added game card is in the target state in which dealing ends. Thus, the availability is high.

In some optional embodiments, the game information includes card location information about a location of the newly added game card on the game desktop, and step 103 may include: determining, based on a location of the newly added game card in at least one image frame when the newly added game card is in the target state in which dealing ends, and regions into which the game desktop is divided in advance and which respectively correspond to game players, a region for a game player to which the location of the newly added game card belongs as the card location information about a location of the newly added game card on the game desktop.

In an embodiment of the present disclosure, at least one image frame when the newly added game card is in the target state may be taken from the video streams synchronously acquired from multiple views on the game desktop.

For example, the game desktop is divided in advance into the regions respectively corresponding to game players. It is assumed that the left half of the game desktop is a region for game player 1, and the right half of the game desktop is a region for game player 2. If the newly added game card is on the left side of the game desktop, the region for game player 1 may be determined as the card location information about a location of the newly added game card on the game desktop.

Figure 10:
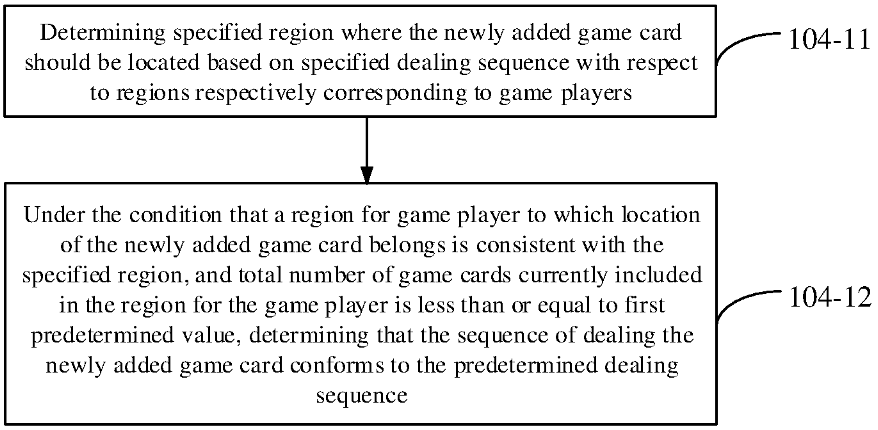
FIG. 10 is a flowchart of a process of performing an operation of the method in FIG. 1 according to an exemplary embodiment of the present disclosure.

Accordingly, as shown in FIG. 10, step 104 may include steps 104-11~104-12.

At step 104-11, a specified region where the newly added game card should be located may be determined based on a specified dealing sequence with respect to regions respectively corresponding to game players.

For example, if the specified dealing sequence is as follows: game player 1, game player 2, game player 1, game player 2, . . . , and the newly added game card is the $3^{rd}$ dealt card, it may be determined that the specified region where the newly added game card should be located is the region for game player 1.

At step 104-12, under the condition that a region for a game player to which the location of the newly added game card belongs is consistent with the specified region, and a total number of game cards currently included in the region for the game player to which the location of the newly added game card belongs is less than or equal to a first predetermined value, it may be determined that the sequence of dealing the newly added game card conforms to the predetermined dealing sequence. The first predetermined value may be determined according to a game rule. For example, the first predetermined value may be an upper limit of the number of game cards which can be dealt to each player.

For example, if a region for a game player to which the location of the newly added game card belongs is the region for player 1, the specified region is also the region for player 1, the number of the game cards currently included in the region for the game player to which the location of the newly added game card belongs is 2, and the first predetermined value is also 2, it may be determined that the sequence of dealing the newly added game card conforms to the predetermined dealing sequence.

In the foregoing embodiments, when the game information includes the card location information about a location of the newly added game card on the game desktop, it may be determined whether the sequence of dealing the newly added game card conforms to the predetermined dealing sequence, thereby achieving an objective of automatically detecting the dealing sequence and improving game intelligence.

Figure 11:
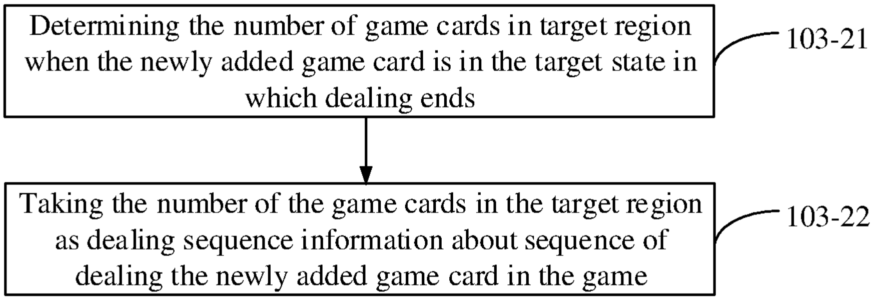
FIG. 11 is a flowchart of a process of performing an operation of the method in FIG. 1 according to an exemplary embodiment of the present disclosure.

In some optional embodiments, the game information includes dealing sequence information about a sequence of dealing the newly added game card in the game. For example, as shown in FIG. 11, step 103 may include steps 103-21~103-22.

At step 103-21, the number of game cards in a target region when the newly added game card is in the target state in which dealing ends is determined.

The target region may be a region of the game desktop where one or more game cards in the target state in which dealing ends are located. For example, a separate region for dealing game cards may be obtained by dividing the game desktop, and each game card is placed in this region after dealing thereof ends. In an embodiment of the present disclosure, the number of all the game cards in the target region may be determined.

At step 103-22, the number of the game cards in the target region is taken as the dealing sequence information about a sequence of dealing the newly added game card in the game.

For example, if the number of the game cards in the target region is 4, the dealing sequence information about a sequence of dealing the newly added game card in the game is also 4.

Figure 12:
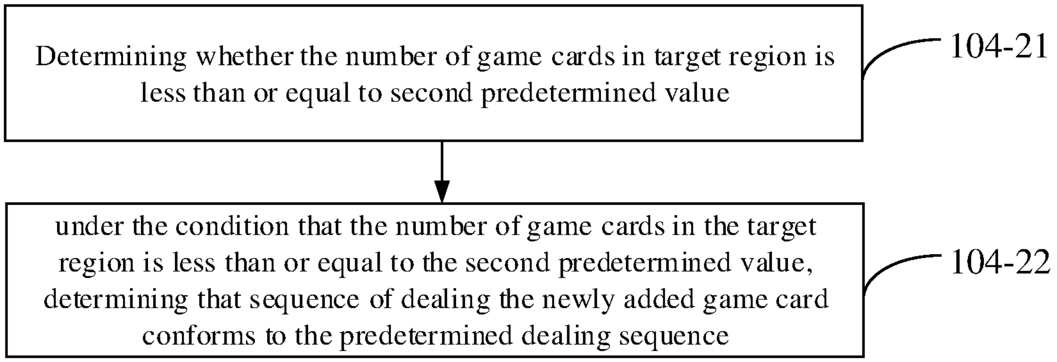
FIG. 12 is a flowchart of a process of performing an operation of the method in FIG. 1 according to an exemplary embodiment of the present disclosure.

Accordingly, as shown in FIG. 12, step 104 may include steps 104-21~104-22.

At step 104-21, it is determined whether the number of the game cards in the target region is less than or equal to a second predetermined value. The second predetermined value may be determined according to a game rule. For example, the second predetermined value may be an upper limit of the number of game cards in the target region.

At step 104-22, under the condition that the number of the game cards in the target region is less than or equal to the second predetermined value, it is determined that the sequence of dealing the newly added game card conforms to the predetermined dealing sequence.

For example, if the second predetermined value is 5 and the number of game cards in the target region is 4, it may be determined that the sequence of dealing the newly added game card conforms to the predetermined dealing sequence.

In the foregoing embodiments, if the game information includes the dealing sequence information about a sequence of dealing the newly added game card in the game, it may be determined whether the sequence of dealing the newly added game card conforms to the predetermined dealing sequence, thereby achieving the objective of automatically detecting the dealing sequence and improving game intelligence.

Figure 13:
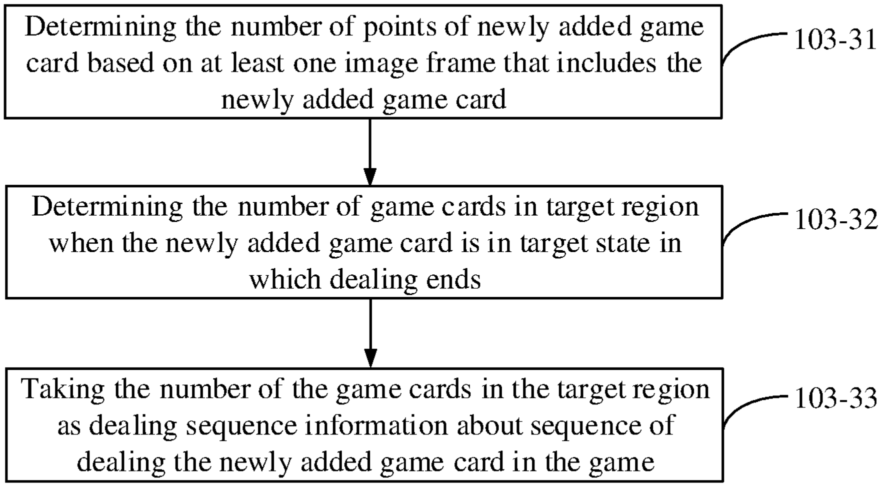
FIG. 13 is a flowchart of a process of performing an operation of the method in FIG. 1 according to an exemplary embodiment of the present disclosure.

In some optional embodiments, the game information includes card identity information about identity of the newly added game card and dealing sequence information about a sequence of dealing the newly added game card in the game. For example, as shown in FIG. 13, step 103 may include steps 103-31~103-33.

At step 103-31, the number of points of the newly added game card is determined based on at least one image frame that includes the newly added game card.

In an embodiment of the present disclosure, the at least one image frame that includes the newly added game card may be at least one image frame when it is determined that the newly added game card is in the target state in which dealing ends, and/or at least one image frame before a next newly added game card appears after the newly added game card is in the target state in which dealing ends.

The at least one image frame that includes the newly added game card may be input to a card identity recognition neural network, so as to obtain the number of points of the newly added game card output by the card identity recognition neural network. The number of points belongs to the card identity information about identity of the newly added game card.

A deep neural network such as ResNet-18 (a residual network that is 18 layers deep) may be used as a backbone network of the card identity recognition neural network. Multiple sample images with respective labels may be used to train the backbone network, where each sample image includes game card identity information, for example, a suit and the number of points. Network parameters of the backbone network may be adjusted to minimize a loss value of an identification result output by the backbone network with respect to a true value labeled in a respective sample image, thereby obtaining the card identity recognition neural network.

At step 103-32, the number of game cards in a target region when the newly added game card is in the target state in which dealing ends is determined.

In an embodiment of the present disclosure, the target region is a region of the game desktop where one or more game cards in the target state in which dealing ends are located. In this case, the number of all the game cards included in the target region may be determined.

At step 103-33, the number of the game cards in the target region is taken as the dealing sequence information about a sequence of dealing the newly added game card in the game.

Figure 14:
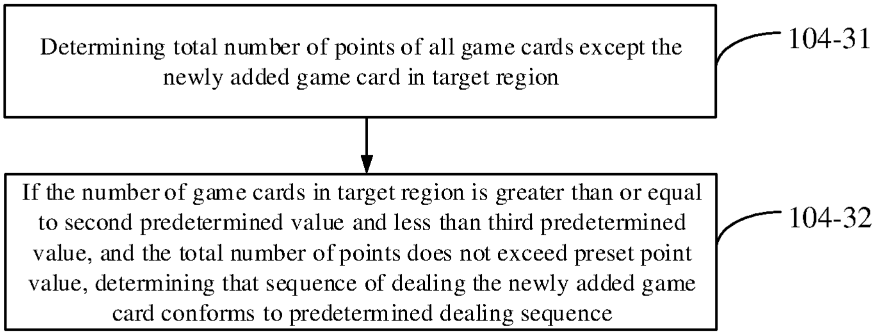
FIG. 14 is a flowchart of a process of performing an operation of the method in FIG. 1 according to an exemplary embodiment of the present disclosure.

Accordingly, for example, as shown in FIG. 14, step 104 may include steps 104-31~104-32.

At step 104-31, a total number of points of all game cards except the newly added game card in the target region is determined.

At step 104-32, if the number of the game cards in the target region is greater than or equal to a second predetermined value and less than a third predetermined value, and the total number of points does not exceed a preset point value, it is determined that the sequence of dealing the newly added game card conforms to the predetermined dealing sequence. The third predetermined value may be determined according to a game rule. For example, the third predetermined value may be an upper limit of the number of game cards in the target region when a game player wins a current game.

In an embodiment of the present disclosure, if the second predetermined value is 5, the third predetermined value is 6, and the number of game cards in the target region is 5, it may be directly determined that the sequence of dealing the newly added game card conforms to the predetermined dealing sequence. Then, a total number of points of the five game cards in the target region is calculated. Assuming that the total number is 18, and the preset point value is 21, it may be determined that a further game card may be dealt.

In the foregoing embodiments, if the game information includes the card identity information about identity of the newly added game card and the dealing sequence information about a sequence of dealing the newly added game card in the game, it may be determined that the sequence of dealing the newly added game card conforms to the predetermined dealing sequence, thereby achieving the objective of automatically detecting the dealing sequence and improving game intelligence.

In some optional embodiments, dealing sequence detection may be automatically performed as above in an intelligent game place. Taking Baccarat as an example, each game card in the target state in which dealing ends is in the target region. Therefore, it may be determined, by detecting the newly added game card in the target region, whether the sequence of dealing the newly added game card conforms to the predetermined dealing sequence. It is assumed that the second predetermined value is 5, and the third predetermined value is 6. When the number of the game cards included in the target region is 4, it may be determined that the sequence of dealing the newly added game card conforms to the predetermined dealing sequence. When the number of the game cards included in the target region is 5, a total number of points of the game cards in the target region may be determined. If the total number of points does not exceed the preset point value, it is determined that the sixth card may be further dealt; otherwise, it is determined that the sixth card should not be further dealt. Therefore, in the aforementioned manner, loss caused to a player by a dealing sequence error during manual dealing can be avoided.

In addition, the present disclosure may provide apparatus embodiments corresponding to the above method embodiments.

Figure 15:
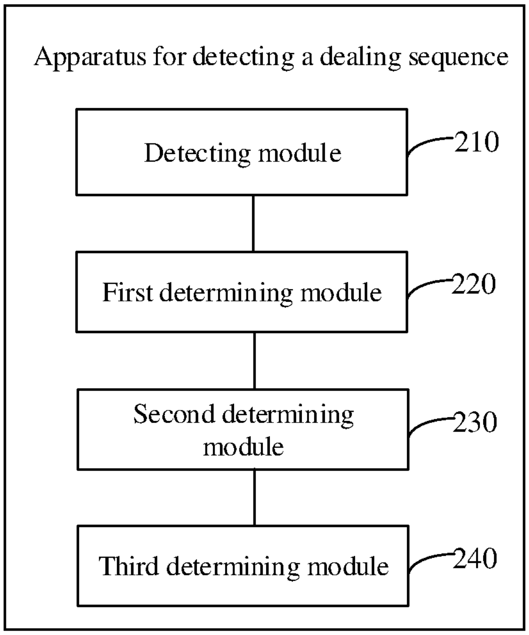
FIG. 15 is a block diagram of an apparatus for detecting a dealing sequence according to an exemplary embodiment of the present disclosure.

FIG. 15 is a block diagram of an apparatus for detecting a dealing sequence according to an exemplary embodiment of the present disclosure. The apparatus may include: a detecting module 210 configured to obtain a video stream of a game desktop and detect a game card from multiple image frames included in the video stream; a first determining module 220 configured to, in response to the detecting module 210 detecting a newly added game card from at least one of the multiple image frames, determine whether the newly added game card is in a target state in which dealing ends; a second determining module 230 configured to: after it is determined by the first determining module 220 that the newly added game card is in the target state in which dealing ends, determine game information corresponding to the newly added game card; and a third determining module 240 configured to determine, based on the game information, whether a sequence of dealing the newly added game card conforms to a predetermined dealing sequence.

In some optional embodiments, the detecting module may input each image frame in the video stream to an object detection neural network to obtain an object detection result output by the object detection neural network. The object detection result may at least indicate whether a game card is involved in the image frame of the video stream, and a location of the game card in the image frame with the game card involved therein.

In some optional embodiments, the first determining module includes: a first determining sub-module configured to determine a distance between respective locations of the newly added game card in any two image frames among a predetermined number of image frames each involving the newly added game card; a second determining sub-module configured to determine whether the distance between the respective locations satisfies a predetermined distance condition; and a third determining sub-module configured to, if it is determined by the second determining sub-module that the distance satisfies the predetermined distance condition, determine that the newly added game card is in the target state in which dealing ends.

In some optional embodiments, the first determining sub-module includes: a first determining unit configured to determine, based on at least two adjacent image frames among the predetermined number of image frames, a motion trajectory of each game card included in the at least two adjacent image frames, where the at least two adjacent image frames include a current image frame and a previous image frame adjacent thereto; a predicting unit configured to predict, based on the motion trajectory of each game card in the at least two adjacent image frames, a location of the game card in a next image frame adjacent to the current image frame; an obtaining unit configured to obtain a detected location of each game card included in the next image frame; a second determining unit configured to match the predicted location with the detected location to determine a location of the newly added game card in the next image frame; and a third determining unit configured to determine a distance between respective locations of the newly added game card in any two image frames among the predetermined number of image frames.

In some optional embodiments, the second determining sub-module includes: a fourth determining unit configured to determine a first area of an overlapping part between respective target bounding boxes of the newly added game card in any two image frames among the predetermined number of image frames, and a second area other than the first area, occupied by the respective target bounding boxes; a fifth determining unit configured to take a sum of the first area and the second area as a third area; and a sixth determining unit configured to, if a ratio of the first area to the third area is greater than a predetermined value, determine that the distance between the respective locations of the newly added game card in the two image frames satisfies the predetermined distance condition.

In some optional embodiments, the game information corresponding to the newly added game card includes at least one of the following: card location information about a location of the newly added game card on the game desktop, dealing sequence information about a sequence of dealing the newly added game card in a game, or card identity information about identity of the newly added game card. The card identity information includes at least one of a suit or the number of points.

In some optional embodiments, the game information includes the card location information about a location of the newly added game card on the game desktop. The second determining module includes: a fourth determining sub-module configured to determine, based on a location of the newly added game card in at least one image frame when the newly added game card is in the target state in which dealing ends, and regions into which the game desktop is divided in advance and which respectively correspond to game players, a region for a game player to which the location of the newly added game card belongs as the card location information about a location of the newly added game card on the game desktop. The third determining module includes: a fifth determining sub-module configured to determine, based on a specified dealing sequence with respect to regions respectively corresponding to game players, a specified region where the newly added game card should be located; and a sixth determining sub-module configured to, under the condition that the region for the game player to which the location of the newly added game card belongs is consistent with the specified region, and a total number of game cards currently included in the region for the game player to which the location of the newly added game card belongs is less than or equal to a first predetermined value, determine that the sequence of dealing the newly added game card conforms to the predetermined dealing sequence.

In some optional embodiments, the game information includes the dealing sequence information about a sequence of dealing the newly added game card in the game. The second determining module includes: a seventh determining sub-module configured to determine the number of game cards in a target region when the newly added game card is in the target state in which dealing ends, where the target region is a region of the game desktop where one or more game cards in the target state in which dealing ends are located; and an eighth determining sub-module configured to take the number of the game cards in the target region as the dealing sequence information about a sequence of dealing the newly added game card in the game. The third determining module includes: a ninth determining sub-module configured to determine whether the number of the game cards in the target region is less than or equal to a second predetermined value; and a tenth determining sub-module configured to, if it is determined by the ninth determining sub-module that the number of the game cards in the target region is less than or equal to the second predetermined value, determine that the sequence of dealing the newly added game card conforms to the predetermined dealing sequence.

In some optional embodiments, the game information includes the card identity information about identity of the newly added game card and the dealing sequence information about a sequence of dealing the newly added game card in the game. The second determining module includes: an eleventh determining sub-module configured to determine the number of points of the newly added game card based on at least one image frame that includes the newly added game card; a twelfth determining sub-module configured to determine the number of game cards in a target region when the newly added game card is in the target state in which dealing ends, where the target region is a region of the game desktop where one or more game cards in the target state in which dealing ends are located; and a thirteenth determining sub-module configured to take the number of the game cards in the target region as the dealing sequence information about a sequence of dealing the newly added game card in the game. The third determining module includes: a fourteenth determining sub-module configured to determine a total number of points of all the game cards except the newly added game card in the target region; and a fifteenth determining sub-module configured to, if the number of the game cards in the target region is greater than or equal to a second predetermined value and less than a third predetermined value, and the total number of points does not exceed a preset point value, determine that the sequence of dealing the newly added game card conforms to the predetermined dealing sequence.

Since the apparatus embodiments substantially correspond to the method embodiments, reference may be made to related respective parts of the description of the method embodiments. The apparatus embodiments described above are merely exemplary. Units described as separate parts may or may not be physically separate. A part shown as a unit may or may not be a physical unit, i.e., the part may be located in one position, or may be distributed on a plurality of network units. Some or all of the modules may be selected according to actual requirements to achieve the objectives of the embodiments of the present disclosure. A person of ordinary skill in the art may understand and implement the embodiments of the present disclosure without any inventive effort.

An embodiment of the present disclosure further provides a computer-readable storage medium storing a computer program thereon. The computer program may be used to perform the method of detecting a dealing sequence according to any one of the foregoing embodiments.

In some optional embodiments, the present disclosure further provides a computer program product including computer-readable codes. When the computer-readable code run on a device, a processor in the device executes instructions for implementing the method of detecting a dealing sequence according to any one of the foregoing embodiments.

In some optional embodiments, the present disclosure further provides another computer program product for storing computer-readable instructions which, when executed by a computer, cause the computer to perform the method of detecting a dealing sequence according to any one of the foregoing embodiments.

The computer program product may be implemented specifically in hardware, software, or a combination thereof. In an optional embodiment, the computer program product is specifically embodied as a computer storage medium. In another optional embodiment, the computer program product is specifically embodied as a software product, such as a Software Development Kit (SDK) or the like.

An embodiment of the present disclosure further provides an electronic device including a processor and a memory for storing instructions executable by the processor. The processor is configured to execute the instructions stored in the memory to implement the method of detecting a dealing sequence according to any one of the foregoing embodiments.

Figure 16:
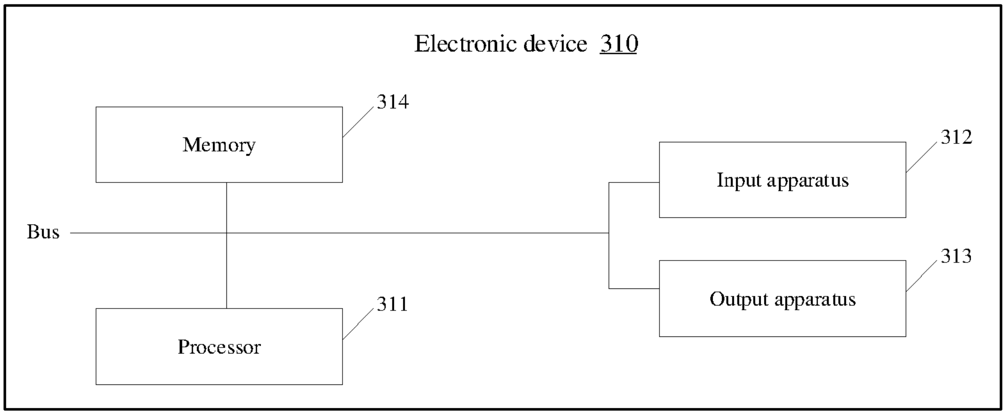
FIG. 16 is a schematic block diagram of an electronic device for detecting a dealing sequence according to an exemplary embodiment of the present disclosure.

FIG. 16 is a schematic block diagram of an electronic device for detecting a dealing sequence according to an embodiment of the present disclosure. The electronic device 310 may include a processor 311, an input apparatus 312, an output apparatus 313, a memory 314, or the like. The input apparatus 312, the output apparatus 313, the memory 314, and the processor 311 may be interconnected via a bus.

The memory 314 may be, for example, a Random Access Memory (RAM), a Read-Only Memory (ROM), an Erasable Programmable Read Only Memory (EPROM), a Compact Disc Read-Only Memory (CD-ROM), or the like. The memory 314 may store instructions executable by the processor 311 and related data.

The input apparatus 312 is used to input data and/or a signal, and the output apparatus 313 is used to output data and/or a signal. The output apparatus 313 and the input apparatus 312 may be separate from each other, or may be integrated.

The processor 311 may be one or more processors, for example, one or more Central Processing Units (CPUs). When the processor 311 is one CPU, the CPU may be a single-core CPU, or may be a multi-core CPU. The processor 311 may execute the instructions stored in the memory 314 to implement the method of detecting a dealing sequence according to any one of the foregoing embodiments.

A person skilled in the art can easily contemplate other possible implementations on the basis of the present disclosure. The present disclosure is intended to cover any variations, usages or adaptive changes of the present disclosure. Such variations, usages or adaptive changes follow general principles of the present disclosure, and may involve common knowledge or conventional technical means in the art that is not described herein. The embodiments described herein are merely illustrative, and the scope and spirit of the present disclosure are indicated by the following claims.

The above description relates to merely some embodiments of the present disclosure, and is not intended to limit the present disclosure. Any modification, equivalent replacement, or variation made without departing from the spirit and principle of the present disclosure shall fall in the scope of the present disclosure.

The invention claimed is:

1. A computer implemented method of detecting a dealing sequence, comprising:

obtaining a video stream of a game desktop, and detecting a game card from multiple image frames included in the video stream;

in response to detecting a newly added game card from at least one of the multiple image frames, determining whether the newly added game card is in a target state in which dealing ends;

after determining that the newly added game card is in the target state in which dealing ends, determining game information corresponding to the newly added game card; and determining, based on the game information, whether a sequence of dealing the newly added game card conforms to a predetermined dealing sequence, wherein the determining of whether the newly added game card is in the target state in which dealing ends comprises:

determining a distance between respective locations of the newly added game card in any two image frames among a predetermined number of image frames each involving the newly added game card;

determining whether the distance between the respective locations satisfies a predetermined distance condition; and in response to determining that the distance satisfies the predetermined distance condition, determining that the newly added game card is in the target state in which dealing ends.

2. The method according to claim 1, wherein the detecting of the game card from the multiple image frames included in the video stream comprises:

inputting each image frame in the video stream to an object detection neural network to obtain an object detection result output by the object detection neural network, wherein the object detection result at least indicates whether a game card is involved in the image frame of the video stream, and a location of the game card in the image frame with the game card involved therein.

3. The method according to claim 1, wherein the determining of the distance between the respective locations of the newly added game card in any two image frames among the predetermined number of image frames comprises:

determining, based on at least two adjacent image frames among the predetermined number of image frames, a motion trajectory of each game card included in the at least two adjacent image frames, wherein the at least two adjacent image frames comprise a current image frame and a previous image frame adjacent thereto;

predicting, based on the motion trajectory of each game card in the at least two adjacent image frames, a location of the game card in a next image frame adjacent to the current image frame;

obtaining a detected location of each game card included in the next image frame;

matching the predicted location with the detected location to determine a location of the newly added game card in the next image frame; and determining a distance between respective locations of the newly added game card in any two image frames among the predetermined number of image frames.

4. The method according to claim 1, wherein the determining of whether the distance between the respective locations satisfies the predetermined distance condition comprises:

determining a first area of an overlapping part between respective target bounding boxes of the newly added game card in any two image frames among the predetermined number of image frames, and a second area other than the first area, occupied by the respective target bounding boxes;

taking a sum of the first area and the second area as a third area; and when a ratio of the first area to the third area is greater than a predetermined value, determining that the distance between the respective locations of the newly added game card in the two image frames satisfies the predetermined distance condition.

5. The method according to claim 1, wherein the game information corresponding to the newly added game card comprises at least one of the following:

card location information about a location of the newly added game card on the game desktop, dealing sequence information about a sequence of dealing the newly added game card in a game, or card identity information about identity of the newly added game card, where the card identity information comprises at least one of a suit or a number of points.

6. The method according to claim 5, wherein the game information comprises the card location information about the location of the newly added game card on the game desktop;

the determining of the game information corresponding to the newly added game card comprises:

determining, based on a location of the newly added game card in at least one image frame when the newly added game card is in the target state in which dealing ends, and regions into which the game desktop is divided in advance and which respectively correspond to game players, a region for a game player to which the location of the newly added game card belongs, as the card location information about the location of the newly added game card on the game desktop; and the determining of whether the sequence of dealing the newly added game card conforms to the predetermined dealing sequence comprises:

determining, based on a specified dealing sequence with respect to regions respectively corresponding to game players, a specified region where the newly added game card should be located; and when the region for the game player to which the location of the newly added game card belongs is consistent with the specified region, and a total number of game cards currently included in the region for the game player to which the location of the newly added game card belongs is less than or equal to a first predetermined value, determining that the sequence of dealing the newly added game card conforms to the predetermined dealing sequence.

7. The method according to claim 5, wherein the game information comprises the dealing sequence information about the sequence of dealing the newly added game card in the game;

the determining of the game information corresponding to the newly added game card comprises:

determining a number of game cards in a target region when the newly added game card is in the target state in which dealing ends, wherein the target region is a region of the game desktop where one or more game cards in the target state in which dealing ends are located; and taking the number of the game cards in the target region as the dealing sequence information about the sequence of dealing the newly added game card in the game; and the determining of whether the sequence of dealing the newly added game card conforms to the predetermined dealing sequence comprises:

determining whether the number of the game cards in the target region is less than or equal to a second predetermined value; and in response to determining that the number of the game cards in the target region is less than or equal to the second predetermined value, determining that the sequence of dealing the newly added game card conforms to the predetermined dealing sequence.

8. The method according to claim 5, wherein the game information comprises the card identity information about the identity of the newly added game card and the dealing sequence information about the sequence of dealing the newly added game card in the game;

the determining of the game information corresponding to the newly added game card comprises:

determining a number of points of the newly added game card based on at least one image frame that involves the newly added game card;

determining a number of game cards in a target region when the newly added game card is in the target state in which dealing ends, wherein the target region is a region of the game desktop where one or more game cards in the target state in which dealing ends are located; and taking the number of the game cards in the target region as the dealing sequence information about the sequence of dealing the newly added game card in the game; and the determining of whether the sequence of dealing the newly added game card conforms to the predetermined dealing sequence comprises:

determining a total number of points of all the game cards except the newly added game card in the target region; and when the number of the game cards in the target region is greater than or equal to a second predetermined value and less than a third predetermined value, and the total number of points does not exceed a preset point value, determining that the sequence of dealing the newly added game card conforms to the predetermined dealing sequence.

9. A non-transitory computer-readable storage medium storing a computer program thereon, wherein the computer program is used to perform operations comprising:

obtaining a video stream of a game desktop, and detecting a game card from multiple image frames included in the video stream;

in response to detecting a newly added game card from at least one of the multiple image frames, determining whether the newly added game card is in a target state in which dealing ends;

after determining that the newly added game card is in the target state in which dealing ends, determining game information corresponding to the newly added game card; and determining, based on the game information, whether a sequence of dealing the newly added game card conforms to a predetermined dealing sequence, wherein the determining of whether the newly added game card is in the target state in which dealing ends comprises:

determining a distance between respective locations of the newly added game card in any two image frames among a predetermined number of image frames each involving the newly added game card;

determining whether the distance between the respective locations satisfies a predetermined distance condition; and in response to determining that the distance satisfies the predetermined distance condition, determining that the newly added game card is in the target state in which dealing ends.

10. The computer-readable storage medium according to claim 9, wherein the detecting of the game card from the multiple image frames included in the video stream comprises:

inputting each image frame in the video stream to an object detection neural network to obtain an object detection result output by the object detection neural network, wherein the object detection result at least indicates whether a game card is involved in the image frame of the video stream, and a location of the game card in the image frame with the game card involved therein.

11. An electronic device, comprising:

a processor; and a memory for storing instructions executable by the processor, wherein the processor is configured to execute the instructions stored in the memory to implement operations comprising:

obtaining a video stream of a game desktop, and detecting a game card from multiple image frames included in the video stream;

in response to detecting a newly added game card from at least one of the multiple image frames, determining whether the newly added game card is in a target state in which dealing ends;

after determining that the newly added game card is in the target state in which dealing ends, determining game information corresponding to the newly added game card; and determining, based on the game information, whether a sequence of dealing the newly added game card conforms to a predetermined dealing sequence, wherein the determining of whether the newly added game card is in the target state in which dealing ends comprises:

determining a distance between respective locations of the newly added game card in any two image frames among a predetermined number of image frames each involving the newly added game card;

determining whether the distance between the respective locations satisfies a predetermined distance condition; and in response to determining that the distance satisfies the predetermined distance condition, determining that the newly added game card is in the target state in which dealing ends.

12. The electronic device according to claim 11, wherein the detecting of the game card from the multiple image frames included in the video stream comprises:

inputting each image frame in the video stream to an object detection neural network to obtain an object detection result output by the object detection neural network, wherein the object detection result at least indicates whether a game card is involved in the image frame of the video stream, and a location of the game card in the image frame with the game card involved therein.

13. The electronic device according to claim 11, wherein the determining of the distance between the respective locations of the newly added game card in any two image frames among the predetermined number of image frames comprises:

determining, based on at least two adjacent image frames among the predetermined number of image frames, a motion trajectory of each game card included in the at least two adjacent image frames, wherein the at least two adjacent image frames comprise a current image frame and a previous image frame adjacent thereto;

predicting, based on the motion trajectory of each game card in the at least two adjacent image frames, a location of the game card in a next image frame adjacent to the current image frame;

obtaining a detected location of each game card included in the next image frame;

matching the predicted location with the detected location to determine a location of the newly added game card in the next image frame; and determining a distance between respective locations of the newly added game card in any two image frames among the predetermined number of image frames.

14. The electronic device according to claim 11, wherein the determining of whether the distance between the respective locations satisfies the predetermined distance condition comprises:

determining a first area of an overlapping part between respective target bounding boxes of the newly added game card in any two image frames among the predetermined number of image frames, and a second area other than the first area, occupied by the respective target bounding boxes;

taking a sum of the first area and the second area as a third area; and when a ratio of the first area to the third area is greater than a predetermined value, determining that the distance between the respective locations of the newly added game card in the two image frames satisfies the predetermined distance condition.

15. The electronic device according to claim 11, wherein the game information corresponding to the newly added game card comprises at least one of the following:

card location information about a location of the newly added game card on the game desktop, dealing sequence information about a sequence of dealing the newly added game card in a game, or card identity information about identity of the newly added game card, where the card identity information comprises at least one of a suit or a number of points.

16. The electronic device according to claim 15, wherein the game information comprises the card location information about the location of the newly added game card on the game desktop;

the determining of the game information corresponding to the newly added game card comprises:

determining, based on a location of the newly added game card in at least one image frame when the newly added game card is in the target state in which dealing ends, and regions into which the game desktop is divided in advance and which respectively correspond to game players, a region for a game player to which the location of the newly added game card belongs, as the card location information about the location of the newly added game card on the game desktop; and the determining of whether the sequence of dealing the newly added game card conforms to the predetermined dealing sequence comprises:

determining, based on a specified dealing sequence with respect to regions respectively corresponding to game players, a specified region where the newly added game card should be located; and when the region for the game player to which the location of the newly added game card belongs is consistent with the specified region, and a total number of game cards currently included in the region for the game player to which the location of the newly added game card belongs is less than or equal to a first predetermined value, determining that the sequence of dealing the newly added game card conforms to the predetermined dealing sequence.

17. The electronic device according to claim 15, wherein the game information comprises the dealing sequence information about the sequence of dealing the newly added game card in the game;

the determining of the game information corresponding to the newly added game card comprises:

determining a number of game cards in a target region when the newly added game card is in the target state in which dealing ends, wherein the target region is a region of the game desktop where one or more game cards in the target state in which dealing ends are located; and taking the number of the game cards in the target region as the dealing sequence information about the sequence of dealing the newly added game card in the game; and the determining of whether the sequence of dealing the newly added game card conforms to the predetermined dealing sequence comprises:

determining whether the number of the game cards in the target region is less than or equal to a second predetermined value; and in response to determining that the number of the game cards in the target region is less than or equal to the second predetermined value, determining that the sequence of dealing the newly added game card conforms to the predetermined dealing sequence.

18. The electronic device according to claim 15, wherein the game information comprises the card identity information about the identity of the newly added game card and the dealing sequence information about the sequence of dealing the newly added game card in the game;

the determining of the game information corresponding to the newly added game card comprises:

determining a number of points of the newly added game card based on at least one image frame that involves the newly added game card;

determining a number of game cards in a target region when the newly added game card is in the target state in which dealing ends, wherein the target region is a region of the game desktop where one or more game cards in the target state in which dealing ends are located; and taking the number of the game cards in the target region as the dealing sequence information about the sequence of dealing the newly added game card in the game; and the determining of whether the sequence of dealing the newly added game card conforms to the predetermined dealing sequence comprises:

determining a total number of points of all the game cards except the newly added game card in the target region; and when the number of the game cards in the target region is greater than or equal to a second predetermined value and less than a third predetermined value, and the total number of points does not exceed a preset point value, determining that the sequence of dealing the newly added game card conforms to the predetermined dealing sequence.

* * * * *